(12) United States Patent
Poulter et al.

(10) Patent No.: US 6,618,730 B1
(45) Date of Patent: Sep. 9, 2003

(54) METHODS AND SYSTEMS FOR MANAGING WORKFLOW

(75) Inventors: Martha C. Poulter, Newtown, CT (US); Peter Cooney, Charlotte, NC (US); James J. McKay, III, Ridgefield, CT (US); Robert O. McNabb, Glastonbury, CT (US); Steven A. Samson, Newtown, CT (US); Anthony G. Casciano, Norwalk, CT (US); Karen L. Savoca, Newtown, CT (US); Richard M. Alexander, Trumbull, CT (US); Steven C. Gross, Naperville, IL (US); Steven Sanicola, Southbury, CT (US); Ferdinand Steyer, Riverside, CT (US)

(73) Assignee: GE Capital Commercial Finance, Inc., Stamford, CT (US)

( * ) Notice: Subject to any disclaimer, the term of this patent is extended or adjusted under 35 U.S.C. 154(b) by 0 days.

(21) Appl. No.: 09/602,519

(22) Filed: Jun. 16, 2000

(51) Int. Cl.$^7$ .............................. G06F 17/30
(52) U.S. Cl. ..................... 707/102; 707/10; 706/45; 706/46; 705/7; 705/9; 705/8
(58) Field of Search ................ 707/505, 508, 707/10, 100–102; 705/80, 1, 9, 7, 8; 709/203, 234, 319; 706/45, 46

(56) References Cited

U.S. PATENT DOCUMENTS

| | | | | |
|---|---|---|---|---|
| 5,878,403 A | | 3/1999 | DeFrancesco et al. | |
| 6,016,478 A | * | 1/2000 | Zhang et al. | 705/8 |
| 6,026,391 A | * | 2/2000 | Osborn et al. | 707/2 |
| 6,115,640 A | * | 9/2000 | Tarumi | 700/100 |
| 6,154,753 A | * | 11/2000 | McFarland | 707/508 |
| 6,161,113 A | * | 12/2000 | Mora et al. | 707/505 |
| 6,275,987 B1 | * | 8/2001 | Fraley et al. | 717/127 |
| 6,317,777 B1 | * | 11/2001 | Skarbo et al. | 709/203 |
| 6,446,053 B1 | * | 9/2002 | Elliott | 705/400 |
| 2001/0014877 A1 | | 8/2001 | DeFrancesco, Jr. et al. | |

OTHER PUBLICATIONS

CMSI Systems, Inc. Products & Services; at URL http://www.cmsinc.com/products/middle.html; 4 pages; as of Sep. 13, 2001.

* cited by examiner

Primary Examiner—Safet Metjahic
Assistant Examiner—Camlinh Nguyen
(74) Attorney, Agent, or Firm—Armstrong Teasdale LLP

(57) ABSTRACT

A workflow management system provides an integrated approach to exchanging information real-time and notifying responsible persons of pending deadlines concerning a particular deal. The web-based system includes a server having a centralized database of deal data and at least one client system facilitates a method of uploading initial proposed deal data, notifying an underwriter of the uploaded proposal, uploading a workflow timeline for the proposed deal and notifying responsible persons that actions for tasks are due according to the timeline. The workflow management system is further configured to restrict database access to authorized users for viewing of and providing updates to the deal.

37 Claims, 8 Drawing Sheets

Set Up New Account

There are 3 steps in this process: — 40
(1) Assign ID and Password
(2) Select Deal Team Members
(3) Set up initial timeline Select a Deal: [ ▼ ] — 42

The ID should be a mutation of the Company Name.

Assign ID: [ ] — 44

Passwords must be at least 6 characters long, at least one of which must be a number or special character.

Assign Password: [ ] — 46

— 48    — 50
( Submit )  ( Cancel )

FIG. 3

Commercial Finance Deal Team

| Role | Name — 60 | Reminders | Primary Contact |
|---|---|---|---|
| Originator: | —Select an Originator— ▼ — 62 | ☐ — 74 | ○ — 76 |
| Underwriter: | —Select an Underwriter— ▼ — 64 | ☐ — 74 | ○ — 76 |
| Portfolio Manager: | —Select a Portfolio Manager— ▼ — 66 | ☐ — 74 | ○ — 76 |
| Auditor: | —Select an Auditor— ▼ — 68 | ☐ — 74 | ○ — 76 |
| INT Legal Counsel: | —Select a Legal Counsel— ▼ — 70 | ☐ — 74 | ○ — 76 |
| External Legal Counsel: | —Select a External Counsel— ▼ — 72 | ☐ — 74 | ○ — 76 |

— 78    — 80
( Continue )  ( Cancel )

Commercial Finance Deal Team

Sene Foods Corporation

— 110

| | | |
|---|---|---|
| SIC Code: | 0000 ▼ | —112 |
| Deal Category: | NewDeal ▼ | —114 |
| Deal Type: | Agent ▼ | —116 |
| Deal Class: | AssetBased ▼ | —118 |
| Commitments: | $ 188888.0  MM | —120 |
| Deal Status: | Open ▼ | —122 |
| Financing Need: | Acquisitions/Buyouts ▼ | —124 |
| Winning Lender: | | |
| Lost Date: | Jan ▼ 01 ▼ 1999 ▼ | |
| Not Approved By: | Board ▼ | 126 |
| Reasons: | Pricing ▼ | |
| VOC Contact: | Yes ▼ | |
| VOC Comments: | Test by Saravan ▼ | |

FIG. 6

Commercial Finance Deal Team — 140

Select a company to access their deal:

Sene Foods Corporation
Project SCI — 142

( Open ) —144

FIG. 7 figure 8B →

| | | | | |
|---|---|---|---|---|
| | | | →Log Off | 150 |

Capital Business Credit Extranet

Workflow Home  Setup Extranet  My Notification Prefs  Help

Commercial Finance Deal Team

Sene Foods Corporation

Deal process is: Fast Track

| Original Due Date<br>152 | Current Due Date<br>154 | Actual Completion<br>156 | Task<br>158 | Responsibility<br>160 | |
|---|---|---|---|---|---|
| 01/03/2000 | 01/06/2000 | 11/17/2000 | PIC | TOM CALLAHAN | go — 162 |
| 01/16/2000 | 01/16/2000 | 01/16/2000 | Proposal Issued | TOM CALLAHAN | go |
| 02/01/2000 | 02/01/2000 | 02/01/2000 | Proposal Signed | Jane Smith | go |
| 02/05/2000 | 02/05/2000 | 02/05/2000 | Receive Deposit | Jane Smith | go |
| 02/15/2000 | 02/15/2000 | 02/15/2000 | Review Audit Procedures | BOB GRANA | go |
| 02/20/2000 | 02/20/2000 | 02/20/2000 | Commence Audit | BOB GRANA | go — 162 |
| 02/25/2000 | 02/25/2000 | 02/25/2000 | Commence Due Diligence | BOB GRANA | go |
| 03/01/2000 | 03/01/2000 | 03/01/2000 | Send Underwriting Information | Jane Smith | go |

Deal Administration
Deal Information
Deal Timeline
Documents
Contact Info

| | | | |
|---|---|---|---|
| 03/06/2000 | 03/06/2000 | Complete Audit | BOB GRANA | go |
| 03/01/2000 | 03/01/2000 | Send Underwriting Information | Jane Smith | go |
| 03/06/2000 | 03/06/2000 | Complete Audit | BOB GRANA | go |
| 03/11/2000 | 03/11/2000 | Complete Due Diligence | BOB GRANA | go |
| 03/16/2000 | 03/16/2000 | Conduct Management Meeting | BOB GRANA | go |
| 03/21/2000 | 03/21/2000 | Review Borrowing Base | BOB GRANA | go |
| 03/26/2000 | 03/26/2000 | SVP Underwriting Appr. | BOB GRANA | go |
| 03/31/2000 | 03/31/2000 | CF Approved | BOB GRANA | go |
| 04/05/2000 | 04/08/2000 | Final Approval | BOB GRANA | go |
| 04/10/2000 | 04/11/2000 | Issue Commitment Letter | ANTHONY DIGIACOMO | go |
| 04/15/2000 | 04/16/2000 | Signed Commitment Letter | ANTHONY DIGIACOMO | go |
| 04/20/2000 | 04/21/2000 | Receive Commitment Fee | BOB GRANA | go |
| 04/25/2000 | 04/26/2000 | Prepare Credit Agreement | ANTHONY DIGIACOMO | go |
| 04/30/2000 | 05/01/2000 | Send Credit Agreement | BOB GRANA | go |
| 05/05/2000 | 05/06/2000 | Finalize Credit Agreement | ANTHONY DIGIACOMO | go |
| 05/10/2000 | 05/11/2000 | Pre-Fund Audit | BOB GRANA | go |
| 05/15/2000 | 05/16/2000 | Close | BOB GRANA | go |

150

Edit All Task Information

Deal Administration | Deal Information | Deal Timeline | Documents | Contact Info

FIG. 8B

Commercial Finance Deal Team

PIC

Actual Completion: [Nov ▼] [17 ▼] [2000 ▼] ⟵ 172

Current Due Data: [Jan ▼] [06 ▼] [2000 ▼] ⟵ 174

Original Due Date: 01/03/2000

Responsibility: [TOM CALLAHAN ▼] ⟵ 176

Description: [Obtain PIC Approval] ⟵ 178

Comments: [BLAH BLAH Test] ⟵ 180

[Save] ⟵ 182   [Cancel] ⟵ 184

Documents

Sene Foods Corporation

Select a view: [All documents ▼] ⟵ 192   (go)   (Post a document) ⟵ 202

Click on any document name to download ⟵ 190

| Posted | Document | Version | Posted By |
|---|---|---|---|
| 04-10-2000 | CORE.doc | 1 | Jane Smith |
| 04-11-2000 | Alpha Deal DW flds.doc | 2 | Jane Smith |
| 04-13-2000 | AlphaDealDWflds.doc | 3 | Jane Smith |
| 04-13-2000 | WRForm.dot | 1 | Jane Smith |
| 04-20-2000 | CASEconf.doc | 1 | Jane Smith |
| 04-25-2000 | 2000Pricing Model.xls | 1 | Jane Smith |

Deal Timeline | Documents | Contact Information | Profile | Help

FIG. 10

METHODS AND SYSTEMS FOR MANAGING WORKFLOW

BACKGROUND OF THE INVENTION

This invention relates generally to a computer network-based system and more particularly to systems and methods for managing workflow both internally to provide services to customers and externally to allow customers to monitor workflow.

Electronic information exchange has improved workflow management problems to some extent, however differences between, for example, two companies interested in making a deal still exist. Legacy formatting issues between the companies and differences in procedures have left much of the inefficiencies found in paper based methods unaffected. For example, time expended manually in gathering information regarding the deal and possibly converting the information into a different format contribute to the inefficiencies. Overall, both the traditional paper methods and known electronic methods can be very frustrating and may not necessarily facilitate resolving workflow management issues.

It would be desirable to manage workflow issues by implementing a web-based system that allows real-time access to project status, both internally to the supplier of services and externally to the customer where they can monitor the workflow of services provided, while eliminating the inefficiencies of known systems thereby providing higher customer satisfaction and reduction in deal cycle time.

BRIEF SUMMARY OF THE INVENTION

A workflow management system providing an integrated approach to exchanging information real-time and notifying responsible persons to pending commitments concerning a particular deal is disclosed. The web-based system includes a server having a centralized database of deal data. The connecting of at least one client system to the server facilitates a method of uploading initial proposed deal data, notifying an underwriter of the uploaded proposal, uploading a workflow timeline for the proposed deal and notifying responsible persons that actions for tasks are due according to the timeline.

The workflow management system is further configured to restrict database access only to authorized users for viewing of and providing updates to the deal.

BRIEF DESCRIPTION OF THE DRAWINGS

FIG. 3 is an exemplary embodiment of a web page for setting up a proposed deal;

FIG. 4 is an exemplary embodiment of a web page for setting up basic deal member information;

FIG. 5 is an exemplary embodiment of a web page for setting up a workflow timeline;

FIG. 6 is an exemplary embodiment of a web page for entering deal data;

FIG. 7 is an exemplary embodiment of a web page for entering a company selection;

FIG. 8 is an exemplary embodiment of a web page for reviewing and choosing tasks from a company's deal;

FIG. 9 is an exemplary embodiment of a web page for updating a deal; and

FIG. 10 is an exemplary example of a web page for viewing a user's documents.

DETAILED DESCRIPTION OF THE INVENTION

Figure 1:
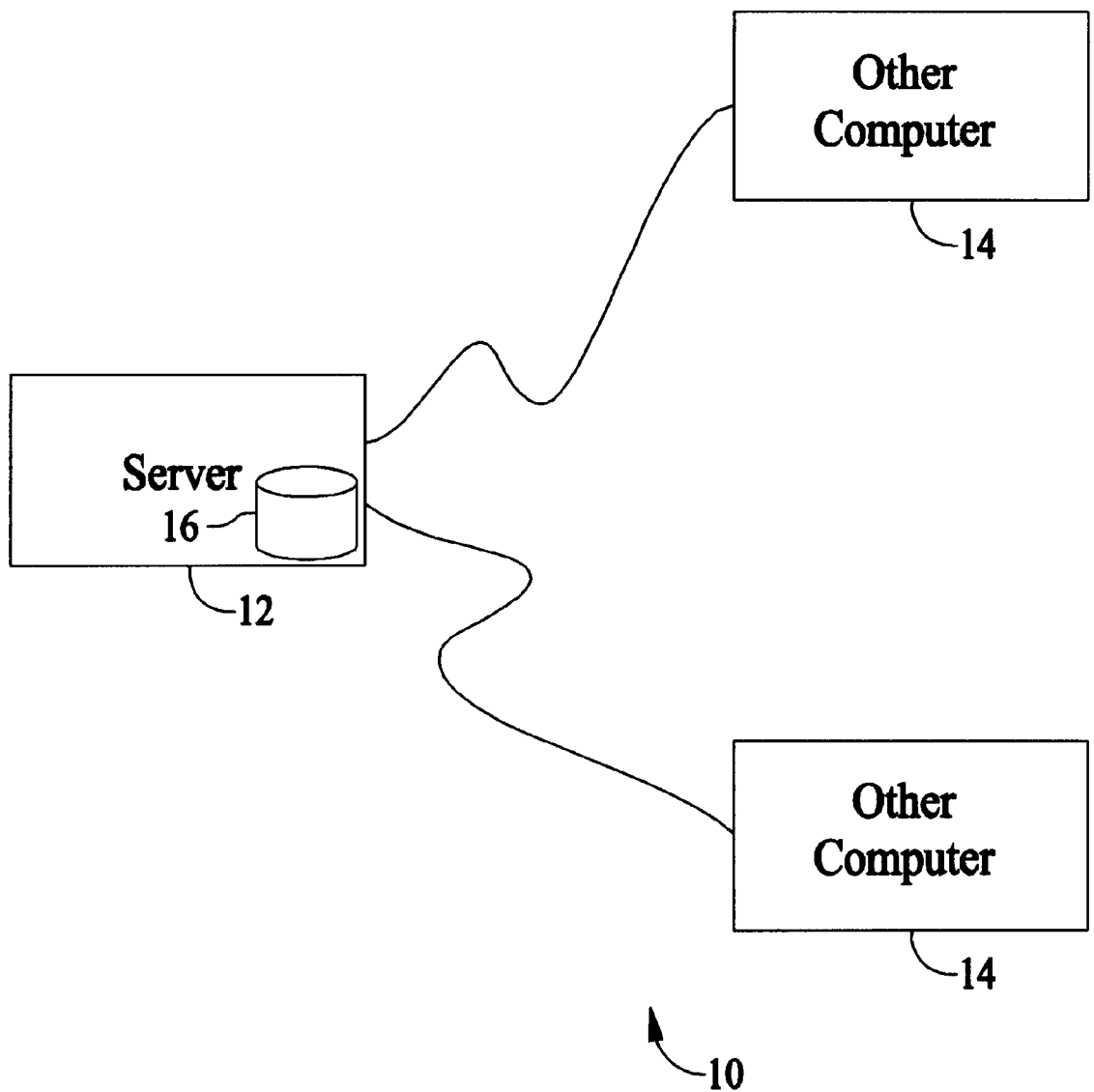
FIG. 1 is a system diagram.

FIG. 1 is a block diagram of a system 10 in accordance with one embodiment of the present invention. System 10 includes a server system 12 and a plurality of client systems 14 connected to server system 12. In one embodiment, a client system 14 is a computer including a web browser. Server system 12 is accessible to client system 14 via the Internet. Client system 14 is interconnected to the Internet through many interfaces including dial-in-connections, cable modems, special high-speed ISDN lines and networks such as local area networks (LANs) or wide area networks (WANs). Client system 14 could be any client system capable of interconnecting to the Internet including a web-based phone or other web-based connectable equipment. Server 12 is configured with a workflow management program and associated web pages and further includes a database 16 configured with, for example, data from multiple projects which can be accessed and updated by registered users, both internal and external to the company providing the services, through the web pages at one of client systems 14 by logging onto server system 12.

Figure 2:
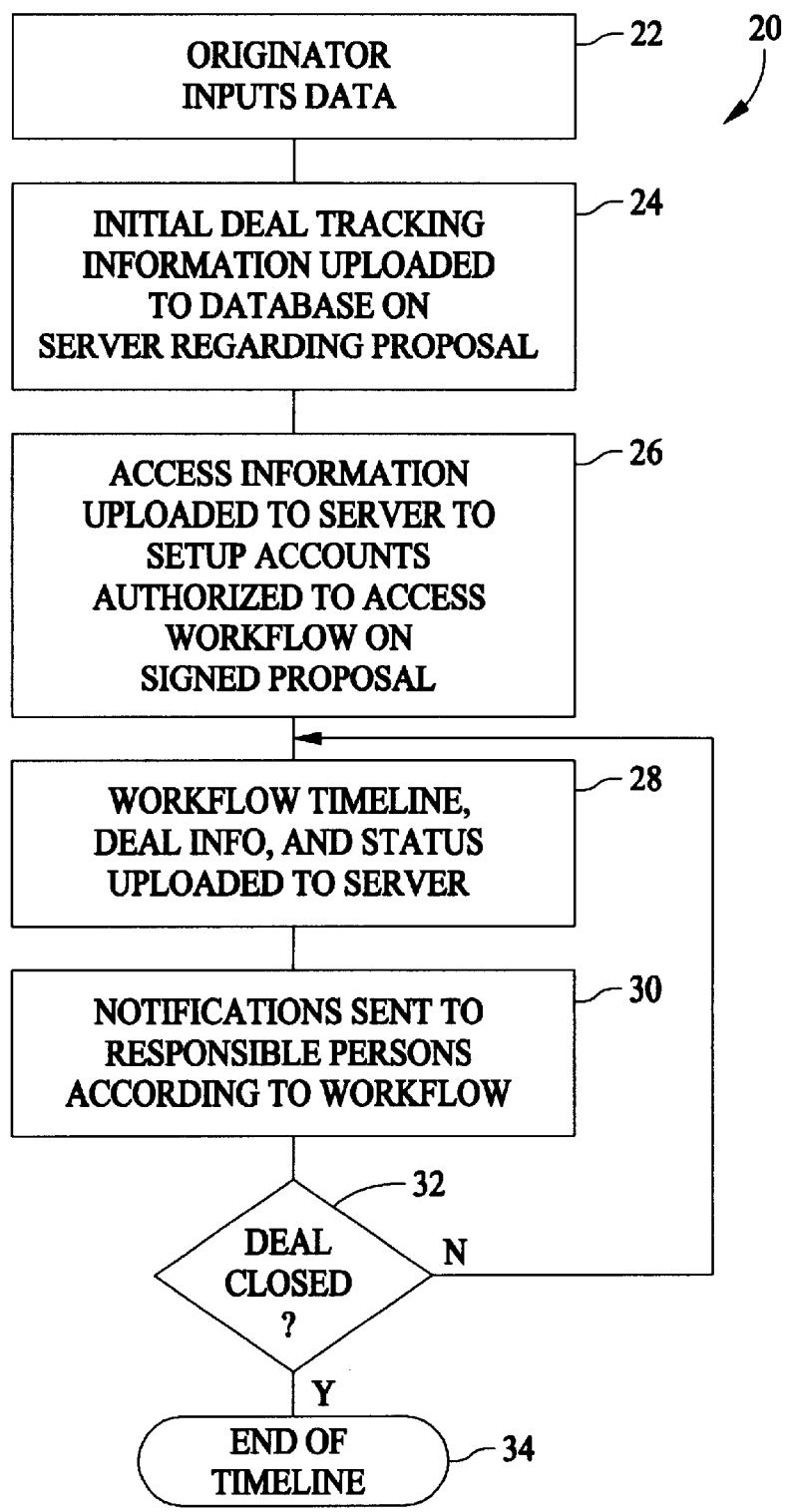
FIG. 2 is a flowchart giving an overview of a web-based workflow management system.

FIG. 2 is a flowchart 20 giving an overview of a workflow management method and system. An originator inputs 22 data of the contemplated deal into client system 14 (shown in FIG. 1) to be uploaded 24 to server 12 to be stored within database 16. Once a proposal is given preliminary approval, an underwriter uploads 26 information regarding access privileges for those individuals inside and outside of the company that require access to the proposal information. The underwriter also uploads 28 a workflow timeline, and appropriate documents to server 12 so that those with access rights may view and update progress of the deal. Server 12 is configured to monitor progress of the deal, and when a task has been completed and a responsible person for a task has uploaded a completion for an action item or task, a notification is sent 30 to the responsible person for the next task or tasks that appear on the workflow timeline. The underwriter also monitors overdue tasks and sends reminders to the responsible party about that event. If a task within a deal is completed and is a last task, system 10 verifies the deal is closed 32. If the deal has closed, no further notifications are sent and the deal is considered to be at the end of the timeline 34. Alternatively, if the deal is not closed, system 10 waits for updates to be uploaded 28 regarding the timeline, deal information or status and prepares to send the notification to the next responsible person.

FIG. 3 is an exemplary deal input page 40 as described above. Page 40 includes formatted information from database 16 (shown in FIG. 1) and includes data entry fields used to setup up access to information regarding a particular deal. Page 40 includes a deal name field 42, an identification assignment field 44 and a password assignment field 46. Deal name field 42 may be configured as a pull down menu. Links exist to either submit the entered information to database 16 or to cancel the deal access setup. A submit link 48 causes the information entered into the data entry fields to be uploaded to server 12 and stored in database 16 and a cancel link 50 causes the deal access setup to be cancelled.

FIG. 4 is an exemplary contact page 60 used to enter basic deal member contact information. Page 60 includes data entry fields used to enter contact information to be uploaded to server 12 and stored in database 16. Data entry fields include an originator field 62, an underwriter field 64, a portfolio manager field 66, an auditor field 68, an internal legal counsel field 70, and an external legal counsel field 72. The data entry fields are configured as pull down menus with selections stored in server 12. Reminder fields 74 are located adjacent the data entry fields described above and are configured to notify the contacts entered, in one embodiment via E-mail, if reminder field 74 is checked. Similarly, primary contact fields 76 are adjacent to reminder fields 74. If checked, primary contact fields 76 notify other users who the primary contacts for the deal being accessed. Links exist to either submit the entered information to database 16 or to cancel the basic contact information setup. Selection of a continue link 78 causes server 12 to upload the information entered into the data entry fields and store that information in database 16 and selection of a cancel link 80 causes server 12 to cancel the basic contact information setup.

Figure 5:
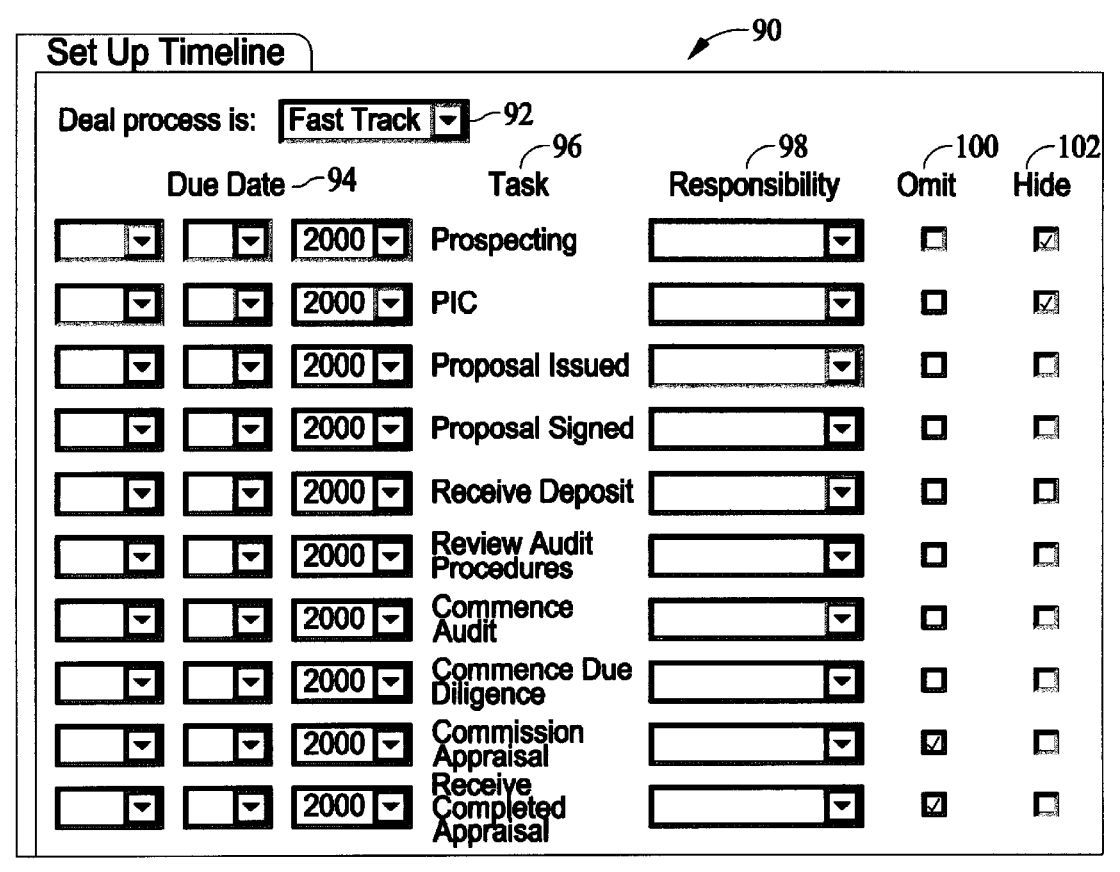

FIG. 5 is an exemplary timeline page 90 used to enter initial timeline information. Page 90 includes data entry fields used to enter initial timeline information to be uploaded to server 12 and stored in database 16. Initial timeline information includes a deal process type 92, a due date 94 for each task 96 listed, and a responsible person 98 for each task 96. Deal process type 92, due date 94, responsible person 98 may be configured as pull down menus with selections stored in server 12. Omit fields 100 may be selected which omit the particular task 96 omitted from the timeline. Hide fields 102 may be selected to hide the particular task 96 from an authorized external user.

FIG. 6 is an exemplary deal page 110. Deal page 110 includes data entry fields to be used in uploading the parameters of a deal to server 12. Included on page 110 are data entry fields for company identifier codes 112, deal category 114, deal type 116, deal class 118, financial commitment 120, deal status 122 and financing need 124. The fields regarding the deal parameters are updated with deal parameter information when the timeline parameters (described above) are entered and are used in reviewing the deal for approval. Also included in FIG. 6, are lost deal fields 126 which are used to enter data on why a particular deal was lost. Lost deal fields 126 are not used when entering deal parameters.

FIG. 7 is an exemplary company selection page 140. Page 140 is downloaded from server 12, in one embodiment, based upon the role of the user in the organization. Based upon the user's role a menu 142 is presented to the user with an appropriate list of companies in the deal process. Role definitions include, but are not limited to a user's deals, a users team's deals, deals from a region, or all deals. Using page 140, the user simply chooses one of a number of appropriate companies with which deals are in progress. Page 140 includes a menu 142 from which companies are selected. Once a company is selected from menu 142 an open link 144 causes the company selection from menu 142 to be uploaded to server 12 and the timeline for that deal to be downloaded to the user's client system 14.

FIG. 8 shows an exemplary company timeline page 150, where a user has selected from menu 142 (shown in FIG. 7). Page 150 is downloaded from server 12 to client system 14 and provides information regarding the various tasks involved with a deal such as an original due date 152, a current due date 154, an actual completion date 156, a task list 158, a responsible person 160 for each task, and a go link 162. Go links 162 enable a user to access an update page for each task within a deal (described below).

FIG. 9 is an exemplary updates page 170. Updates page 170 is accessed by an authorized user when task parameters, such as dates and responsibilities, need updating. In one embodiment, page 170 includes data entry fields for an actual completion date 172, a current due date 174, a responsible person 176, a task description 178, and a comments field 180. In the embodiment shown in FIG. 9, the task to be updated represents a pre-investment committee (PIC) approval task, selected from a go link 162 within deal page 150 (both shown in FIG. 8). The task description 178 field and comments field 180 are textual entry fields while completion date 172, due date 174 and responsible person 176 data entry fields may be configured as pull down menus. Links on page 170 exist to either save the entered information to database 16 or to cancel the update. A save link 182 causes the information entered into the data entry fields on page 170 to be uploaded to server 12 and stored in database 16 and a cancel link 184 causes the update to be cancelled.

FIG. 10 is an exemplary documents page 190 which downloads from server 12 and displays at client system 14 documents posted by a user. A view selection field 192 accepts user input as to which, if not all, documents are to be viewed. After uploading a selection from field 192, a list of deals is downloaded from server 12. Included in the list of deals is a posting date 194, which is the date the document was posted, a document name 196, a version number 198 for the document, and a user name 200 of the person who posted the document. A posting link 202 provides a user interface (not shown) where a user may enter and cause to be uploaded to server 12, a document pertaining to a deal.

As described above, the workflow management system greatly reduces the cycle time spent on a deal by improving work prioritization for more efficient deal execution. Deal execution is more efficient because transaction flow management is proactive instead of reactive. Proactive management helps increase customer satisfaction. Real-time, on-line information enhances communication and the need for live meetings regarding the deal and the associated costs in preparation for such meetings is reduced. In addition, performances of responsible persons are enhanced as the online viewing of the deal's progress enables better preparations for any arising problems to be dealt with or that may arise.

Performances in turning around tasks are capable of being analyzed. Estimates used when setting up the timeline for the length of each task are compared with the actual times expended in performance of the tasks. Tasks that take longer than estimated are addressed, and tasks being completed in shorter times than the estimates are noted for a knowledge base to be used in setting up future timelines. The goal being to further reduce the cycle times of tasks and the times of an entire deal process.

A single document repository, including version control and a document check in/check out feature enhances communications capabilities and E-mail notification provides for better, faster response times across all facets of deal workflow management and encourages proactivity regarding issues and opportunities. Security regarding a customer's deals is addressed since only authorized users are able to access a customer's potential deals. In addition, the internal company's concerns regarding confidential deal information is addressed since the authorized external company's authorized users are limited as to which deal information pages can be downloaded for viewing. The external company users can view deal workflow progress, for example, but are not able to access all areas of the deal database.

While the invention has been described in terms of various specific embodiments, those skilled in the art will recognize that the invention can be practiced with modification within the spirit and scope of the claims.

What is claimed is:

1. A method for managing workflow using a web-based system including a server having a centralized database of deal data and at least one client system, said method comprising the steps of:
   uploading initial proposed deal data;
   uploading a workflow timeline for the proposed deal including estimated task completion times;
   notifying responsible persons that actions for tasks are due according to the timeline;
   recording actual task completion times;
   comparing estimated and actual task completion times;
   uploading comparison results to the server for storage in the database;
   creating a knowledge base for generating future workflow timelines based on an analysis of the comparison results; and
   generating future workflow timelines based upon the knowledge base.

2. A method according to claim 1 wherein said step of notifying responsible persons further comprises the step of sending an E-mail to the responsible person.

3. A method according to claim 1 further comprising the step of uploading account information including access privileges for individuals requiring access to the proposed deal.

4. A method according to claim 3 wherein said step of uploading account information including access privileges further comprises the step of uploading access privileges for individuals internal to the company.

5. A method according to claim 3 wherein said step of uploading account information including access privileges further comprises the step of uploading access privileges for individuals external to the company.

6. A method according to claim 1 further comprising the step of uploading updates to the deal information.

7. A method according to claim 6 wherein said step of uploading updates to the deal information further comprises the steps of:
   uploading a deal selection;
   uploading a task selection; and
   uploading at least one of revised due date data, responsible person data, a description and comments.

8. A method according to claim 1 wherein said step of notifying responsible persons that actions for tasks are due further comprises the step of uploading a notification of task completion.

9. A method according to claim 1 wherein said step of uploading initial proposed deal data further comprises the step of uploading at least one of a deal name, an identification assignment and a password assignment.

10. A method according to claim 1 further comprising the step of uploading at least one of an originator, an underwriter, a portfolio manager, an auditor, a prospective customer, an internal legal counsel, and an external legal counsel.

11. A method according to claim 10 wherein said step of uploading further comprises the step of denoting primary contacts.

12. A method according to claim 10 wherein said step of uploading further comprises the step of sending reminder notifications.

13. A method according to claim 1 wherein said step of uploading a workflow timeline further comprises the step of uploading at least one of a deal process type, a due date for each task, a task list, and a responsible person for each task.

14. A method according to claim 13 wherein said step of uploading a workflow timeline further comprises the step of uploading omissions of tasks from a timeline.

15. A method according to claim 13 wherein said step of uploading a workflow timeline further comprises the step of uploading hide fields for the tasks.

16. A method according to claim 1 wherein said step of uploading a workflow timeline further comprises the step of uploading at least one of a company identifier code, deal category, deal type, deal class, financial commitment, deal status, and financing need.

17. A method according to claim 1 wherein the client system and the server are connected via a network.

18. A method according to claim 17 wherein the network is one of a wide area network, a local area network, an intranet, and the Internet.

19. A web-based system for managing workflow, said system comprising:
   at least one client system comprising a browser; and
   a server further comprising a database of deal data, said server configured to be coupled to said client system, and further configured to:
   upload initial proposed deal data;
   upload a workflow timeline for the proposed deal including estimated task completion times;
   notify responsible persons that actions for tasks are due according to the timeline;
   record actual task completion times;
   compare the estimated and actual task completion times;
   upload comparison results for storage in said database;
   create a knowledge base for generating future workflow timelines based on an analysis of the comparison results; and
   generate future workflow timelines based upon said knowledge base.

20. A system according to claim 19 wherein said server further configured to send an E-mail to the responsible person.

21. A system according to claim 19 wherein said server configured to upload account information including access privileges for individuals requiring access to the proposed deal.

22. A system according to claim 21 wherein said server further configured to upload access privileges for individuals internal to the company.

23. A system according to claim 21 wherein said server further configured to upload access privileges for individuals external to the company.

24. A system according to claim 19 wherein said server further configured to upload updates to the deal information.

25. A system according to claim 24 wherein said server further configured to:
   upload a deal selection;
   upload a task selection; and
   upload at least one of revised due date data, responsible person data, a description and comments.

26. A system according to claim 19 wherein said server further configured to upload a notification of task completion.

27. A system according to claim 19 wherein said server further configured to upload at least one of a deal name, an identification assignment and a password assignment.

28. A system according to claim 19 wherein said server further configured to upload at least one of an originator, an underwriter, a portfolio manager, an auditor, an internal legal counsel, and an external legal counsel.

29. A system according to claim 28 wherein said server further configured to upload a denotation of primary contacts.

30. A system according to claim 28 wherein said server further configured to send reminder notifications.

31. A system according to claim 19 wherein said server further configured to upload at least one of a deal process type, a due date for each task, a task list, and a responsible person for each task.

32. A system according to claim 31 wherein said server further configured to upload omissions of tasks from a timeline.

33. A system according to claim 31 wherein said server further configured to upload hide fields for at least one of the tasks.

34. A system according to claim 19 wherein said server further configured to upload at least one of a company identifier code, a deal category, a deal type, a deal class, a financial commitment, a deal status, and a financing need.

35. A method according to claim 19 wherein said client system and said server are coupled via a network.

36. A system according to claim 35 wherein said client system and said server are coupled via one of a wide area network, a local area network, an intranet, and the Internet.

37. A method for managing workflow within a company using a web-based system, including a server having a centralized database of deal data and at least one client system, said method comprising the steps of:

uploading initial proposed deal data including at least one of a deal category, a deal type, a deal class, a financial commitment, a deal status, and a financing need;

uploading access privileges for individuals internal and external to the company including at least one of an underwriter, a portfolio manager, internal legal counsel, and external legal counsel;

uploading a workflow timeline for the proposed deal including estimated task completion times;

notifying responsible persons that actions for tasks are due according to the timeline;

recording actual task completion times;

comparing estimated and actual task completion times;

uploading comparison results to the server for storage in the database;

creating a knowledge base for generating future workflow timelines based on an analysis of the comparison results; and generating future workflow timelines based upon the knowledge base.

* * * * *